(12) United States Patent
McKelvey et al.

(10) Patent No.: US 9,389,602 B2
(45) Date of Patent: Jul. 12, 2016

(54) INDUSTRIAL CONTROLLER AUTOMATION INTERFACE

(71) Applicant: Rockwell Automation Technologies, Inc., Mayfield Heights, OH (US)

(72) Inventors: Jeffrey A. McKelvey, Brookfield, WI (US); Mike D'Amico, East Troy, WI (US)

(73) Assignee: ROCKWELL AUTOMATION, INC., Milwaukee, WI (US)

( * ) Notice: Subject to any disclaimer, the term of this patent is extended or adjusted under 35 U.S.C. 154(b) by 0 days.

(21) Appl. No.: 14/815,045

(22) Filed: Jul. 31, 2015

(65) Prior Publication Data

US 2015/0338838 A1 Nov. 26, 2015

Related U.S. Application Data

(63) Continuation of application No. 13/911,866, filed on Jun. 6, 2013, now Pat. No. 9,104,185, which is a continuation of application No. 12/189,517, filed on Aug. 11, 2008, now Pat. No. 8,484,665, which is a (Continued)

(51) Int. Cl.
*G05B 15/02* (2006.01)
*G05B 19/05* (2006.01)
*G05B 19/418* (2006.01)

(52) U.S. Cl.
CPC .............. *G05B 15/02* (2013.01); *G05B 19/054* (2013.01); *G05B 19/056* (2013.01); *G05B 19/4185* (2013.01); *G05B 2219/13121* (2013.01); *G05B 2219/13128* (2013.01); *G05B 2219/13144* (2013.01); *G05B 2219/13172* (2013.01); *G05B 2219/15027* (2013.01);

(Continued)

(58) Field of Classification Search
None
See application file for complete search history.

(56) References Cited

U.S. PATENT DOCUMENTS 4,410,983 A 10/1983 Cope
4,570,217 A 2/1986 Allen (Continued)

FOREIGN PATENT DOCUMENTS

DE 29600609 2/1997
DE 19850469 5/2000

(Continued)

OTHER PUBLICATIONS

OPC Common Definitions X-002138398 Oct. 27, 1998.

(Continued)

*Primary Examiner* — Tuan Dao
(74) *Attorney, Agent, or Firm* — Amin, Turocy & Watson, LLP

(57) ABSTRACT

An automation interface is provided for interacting with industrial controllers. The automation interface provides for programming, editing, monitoring and maintenance of industrial controllers programmatically from a local or remote location. The automation interface component is adapted to communicate with industrial controllers by integrating a computer process interface library into the automation interface component. The computer process interface library exposes the automation interface component to client application processes, so that the client application processes can communicate with the at least one industrial controller programmatically. The automation interface is provided with functionality for downloading, uploading and programming of control programs to the processors of the industrial controllers.

10 Claims, 10 Drawing Sheets

Related U.S. Application Data continuation of application No. 11/533,991, filed on Sep. 21, 2006, now Pat. No. 7,424,329, which is a continuation of application No. 10/945,189, filed on Sep. 20, 2004, now Pat. No. 7,130,704, which is a continuation of application No. 09/928,623, filed on Aug. 13, 2001, now Pat. No. 6,819,960.

(52) U.S. Cl.
CPC ............ *G05B 2219/15038* (2013.01); *G05B 2219/15052* (2013.01); *G05B 2219/31422* (2013.01); *G05B 2219/32126* (2013.01); *G05B 2219/34038* (2013.01); *Y02P 90/12* (2015.11); *Y02P 90/18* (2015.11)

(56) References Cited

U.S. PATENT DOCUMENTS

| | | | |
|---|---|---|---|
| 4,914,567 A | 4/1990 | Lipkis | |
| 5,127,090 A | 6/1992 | Ruehle | |
| 5,162,986 A | 11/1992 | Graber | |
| 5,168,441 A | 12/1992 | Onarheim | |
| 5,404,288 A | 4/1995 | McDunn | |
| 5,453,933 A | 9/1995 | Wright | |
| 5,555,179 A | 9/1996 | Koyama et al. | |
| 5,576,946 A | 11/1996 | Bender | |
| 5,691,897 A | 11/1997 | Brown | |
| 5,796,602 A | 8/1998 | Wellan | |
| 5,801,942 A | 9/1998 | Nixon | |
| 5,805,442 A | 9/1998 | Crater | |
| 5,812,394 A * | 9/1998 | Lewis | G05B 19/0426 700/17 |
| 5,838,563 A | 11/1998 | Dove | |
| 5,950,006 A | 9/1999 | Crater | |
| 5,970,243 A | 10/1999 | Klein | |
| 5,978,578 A | 11/1999 | Azarya | |
| 5,980,078 A | 11/1999 | Krivoshein | |
| 6,028,998 A | 2/2000 | Gloudeman | |
| 6,064,816 A | 5/2000 | Parthasarathy | |
| 6,105,093 A | 8/2000 | Rosner | |
| 6,122,713 A | 9/2000 | Huang et al. | |
| 6,154,684 A | 11/2000 | Schwenke | |
| 6,161,051 A * | 12/2000 | Hafemann | G05B 19/41885 700/17 |
| 6,167,406 A | 12/2000 | Hoskins et al. | |
| 6,195,795 B1 | 2/2001 | Block et al. | |
| 6,201,996 B1 | 3/2001 | Crater | |
| 6,247,168 B1 | 6/2001 | Green | |
| 6,289,396 B1 | 9/2001 | Keller et al. | |
| 6,363,421 B2 | 3/2002 | Barker et al. | |
| 6,370,569 B1 | 4/2002 | Austin | |
| 6,389,483 B1 | 5/2002 | Larsson | |
| 6,411,987 B1 | 6/2002 | Steger et al. | |
| 6,424,872 B1 | 7/2002 | Glanzer | |
| 6,466,827 B1 | 10/2002 | Stine | |
| 6,467,052 B1 | 10/2002 | Kaler et al. | |
| 6,556,950 B1 | 4/2003 | Schwenke | |
| 6,560,235 B1 | 5/2003 | Jones | |
| 6,628,992 B2 | 9/2003 | Osburn | |
| 6,647,526 B1 | 11/2003 | Holder et al. | |
| 6,668,205 B1 | 12/2003 | Ueno | |
| 6,686,936 B1 | 2/2004 | Nason et al. | |
| 6,708,074 B1 | 3/2004 | Chi | |
| 6,721,607 B2 | 4/2004 | Brault | |
| 6,725,281 B1 | 4/2004 | Zintel | |
| 6,732,296 B1 | 5/2004 | Cherny et al. | |
| 6,754,885 B1 | 6/2004 | Dardinski | |
| 6,763,515 B1 * | 7/2004 | Vazquez | G06F 8/34 715/967 |
| 6,801,813 B2 | 10/2004 | Kay et al. | |
| 6,819,960 B1 | 11/2004 | McKelvey et al. | |
| 6,850,973 B1 | 2/2005 | Larson et al. | |
| 6,853,867 B1 | 2/2005 | Klindt | |
| 6,892,240 B1 * | 5/2005 | Nakajima | H04L 63/0272 370/252 |
| 6,950,851 B2 | 9/2005 | Osburn | |
| 6,952,727 B1 | 10/2005 | Lindner et al. | |
| 6,982,953 B1 | 1/2006 | Swales | |
| 7,062,335 B2 | 6/2006 | Klindt et al. | |
| 7,085,670 B2 | 8/2006 | Odom | |
| 7,089,530 B1 | 8/2006 | Dardinski | |
| 7,120,876 B2 | 10/2006 | Washington | |
| 7,200,632 B1 | 4/2007 | Greschler et al. | |
| 7,213,207 B2 | 5/2007 | Rogers | |
| 7,272,815 B1 | 9/2007 | Eldridge et al. | |
| 7,403,984 B2 | 7/2008 | Ellis | |
| 2002/0059401 A1 | 5/2002 | Austin | |
| 2002/0082737 A1 | 6/2002 | Amrhein et al. | |
| 2002/0120521 A1 * | 8/2002 | Forth | G06Q 10/087 705/26.5 |
| 2002/0152210 A1 | 10/2002 | Johnson et al. | |
| 2002/0152280 A1 | 10/2002 | Winkeler et al. | |
| 2002/0174178 A1 | 11/2002 | Stawikowski | |
| 2002/0191023 A1 | 12/2002 | Chandhoke et al. | |
| 2003/0014498 A1 | 1/2003 | Kreidler et al. | |
| 2003/0090018 A1 | 5/2003 | Bulgrin | |
| 2003/0225462 A1 | 12/2003 | Bachman | |
| 2004/0015844 A1 | 1/2004 | Nicolle | |
| 2004/0098141 A1 | 5/2004 | Martin | |
| 2004/0210629 A1 | 10/2004 | Klindt et al. | |
| 2005/0066340 A1 | 3/2005 | Mathur et al. | |
| 2006/0085798 A1 | 4/2006 | Bendiksen et al. | |

FOREIGN PATENT DOCUMENTS

| | | |
|---|---|---|
| DE | 19850469 A1 | 5/2000 |
| EP | 0266784 A2 | 5/1988 |
| EP | 0269374 A2 | 6/1988 |
| EP | 0376577 A2 | 7/1990 |
| EP | 0825506 | 2/1998 |
| EP | 0825506 A2 | 2/1998 |
| EP | 0838796 A2 | 4/1998 |
| EP | 1284446 | 2/2003 |
| WO | 9507504 A1 | 3/1995 |
| WO | 9726587 A1 | 7/1997 |
| WO | 9813738 A1 | 4/1998 |
| WO | 9946651 A1 | 9/1999 |
| WO | 9960487 A1 | 11/1999 |
| WO | 0023857 A1 | 4/2000 |
| WO | 0034863 A2 | 6/2000 |
| WO | 0039772 A2 | 7/2000 |
| WO | 0070531 A2 | 11/2000 |
| WO | 0077592 A2 | 12/2000 |
| WO | 0109690 A1 | 2/2001 |
| WO | 0150284 A1 | 7/2001 |
| WO | 03032233 A1 | 4/2003 |

OTHER PUBLICATIONS

Hemdt, Automatisieren OLE for Process Control XP-000947452 Nov. 30, 1999, Author: Dr. Ing. Andreas vom Hemdt.
Himstedt, et al., OPC—Kunftig Standard fur Visualisierungs—and Feldbussysteme XP-000735989 Jul. 1, 1997.
Holley, OPC Unites Industrial Automation Systems XP-000832910 Vo. 1, 1997.
Schmoll, Wird OLE for Process Control (OPC) ein neuer Industriestandard? XP-000689324 May 1, 1997.
European Search Report dated Dec. 5, 2002 for European Patent Application serial No. EP25134/Eb.
Office Action dated Nov. 3, 2011 for U.S. Appl. No. 12/189,517.
Office Action dated May 7, 2012 for U.S. Appl. No. 12/189,517.
Office Action dated Oct. 1, 2012 for U.S. Appl. No. 12/189,517.
Notice of Allowance dated Mar. 6, 2013 for U.S. Appl. No. 12/189,517.
Recent Advances in the Modeling, Scheduling and Control of Flexible Automation, Wayne Davis, 1993, pp. 1-14.
The Hardware and Software Interface of a Programmable Logic Controller to an Industrial Grade Process Control System, Akram Hossain, 1990, pp. 1-7.
GE's MEAD User Interface—a flexible menu—and forms driven interface for engineering applications, Magnus Rimvall, 1989, pp. 1-11.

(56) References Cited

OTHER PUBLICATIONS

Extended European Search Report dated Mar. 19, 2013 for European Patent Application No. EP 10 01 2920.4, 7 pages.
Office Action dated Jun. 19, 2007 for U.S. Appl. No. 11/533,991.
Office Action dated Dec. 13, 2007 for U.S. Appl. No. 11/533,991.
Notice of Allowance mailed May 2, 2008 for U.S. Appl. No. 11/533,991.
Office Action dated Oct. 1, 2003 for U.S. Appl. No. 09/928,623.
Office Action dated Feb. 1, 2006 for U.S. Appl. No. 10/945,189.
Notice of Allowance dated Jul. 2, 2004 for U.S. Appl. No. 09/928,623, 11 pages.
Office Action dated Feb. 18, 2004 for U.S. Appl. No. 09/928,623, 9 pages.
Notice of Allowance dated Jun. 19, 2006 for U.S. Appl. No. 10/945,189, 13 pages.
Extended European Search Report mailed Mar. 24, 2014 for European Application No. 10 01 2920, 8 pages.
Office Action for U.S. Appl. No. 13/911,866, dated Aug. 8, 2014, 42 pages.
Office Action dated Jan. 14, 2015 for U.S. Appl. No. 13/911,866, 28 pages.
Notice of Allowance dated Apr. 2, 2015 for U.S. Appl. No. 13/911,866, 47 pgs.
European Office Action for European Patent Application Serial No. 06022511.7 dated Feb. 12, 2016, 4 pages.
OPC-OLE for Process Control—OPC Overview, Version 1.0, dated Oct. 27, 1998, 16 pages.
User Manual for PLC Programming with CoDeSys 2.1, "last update" Jul. 7, 1999, 304 pages.

* cited by examiner

```
01  Public Sub DownloadAProcessor()
02      Dim g_Application As AutoInterface.Application
03      Dim g_Project As AutoInterface.Project
04      Dim EncodedRouteData As String
05
06      '** start Project and store it in the g_Application object variable
07      Set g_Application = CreateObject("Project.Application")
08
09      '** Declare some variables for clarity.
10      Dim ShowDialog As Boolean
11      Dim UseAutoSave As Boolean
12      Dim IgnorePrompts As Boolean
13      Dim OnlineAction As IgxOnlineAction
14
15      '** Initialize these variables to suitable defaults
16      ShowDialog = False
17      UseAutoSave = False
18      IgnorePrompts = True
19      OnlineAction = IgxGoOffline
20
21      '** Open a project from disk that will be downloaded.
22      Set g_Project = g_Application.FileOpen( "C:\Projects\Upload.rsp", ShowDialog, UseAutoSave)
23
24      '** The communication route to the actual processor that this project represents is set up in the
25      '** application when the project is opened. Get this info out now and save it away for later calls
26      '** to upload this processor.
27      EncodedRouteData = g_Project.EncodedRouteString
28      SaveEncodedRouteData EncodedRouteData
29
30      '** Now download the image to the processor.
31      Dim NoError As Boolean
32      NoError = g_Project.Download(IgnorePrompts, OnlineAction, IgxREMOTEPROG)
33  End Sub
```

FIG. 5

```
01 Public Sub UploadAProcessor()
02      Dim g_Application As AutoInterface.Application
03      Dim g_Project As AutoInterface.Project
04      Dim EncodedRouteData As String
06
07
08      '** start Project and store it in the g_Application object variable
09      Set g_Application = CreateObject("Project.Application")
10
11      '** EncodedRouteData holds a string of data that points the project software to the processor on
12      '** the Data Highway+ network it will be performing uploads and downloads on. A function is
13      '**called here to initialize it to a previously obtained value
14
15      InitializeRouteData EncodedRouteData
16
17      '** Now tell project which processor it is to communicate with
18      g_Application.EncodedRouteString = EncodedRouteData
19
20      '** Declare some variables for clarity.
21      Dim IgnorePrompts As Boolean
22      Dim SaveChanges As Boolean
23      Dim AcceptDefaultAction As Booloen
24      Dim UploadAction As IgxUploadDownloadAction
25      Dim OnlineAction As IgxOnlineAction
26      Dim DataBaseAction As IgxSaveAction
27
28      '** Initialize these variables to suitable defaults
29      IgnorePrompts = True
30      SaveChanges = False
31      AcceptDefaultAction = True
32      UploadAction = IgxUploadCurrent
33      OnlineAction = IgxGoOffline
34      DataBaseAction = IgxNoAction
35
36      '** Now make the call that performs the upload. Store the uploaded project object
37      Set g_Project = g_Application.Upload(IgnorePrompts, SaveChanges, UploadAction,
38              _OnlineAction)
39
40      '** Now save the uploaded image to disk as a file called Upload.rsp
41      Dim NoError As Boolean
42      NoError = g_Project.SaveAs(IgnorePrompts, AcceptDefaultAction, _
43              DataBaseAction, "C:\Projects\Upload.rsp")
44 End Sub
```

FIG. 6

```
01    Public Sub InsertLadderRung()
02    Dim g_Application As AutoInterface.Application
03    Dim g_Project As AutoInterface.LogixProject
04    Dim g_ProgFile As AutoInterface.ProgramFile
05    Dim g_LadderFile As AutoInterface.LadderFile
06
07    '** start AutoInterface and store it in the g_Application object variable
08    Set g_Application = CreateObject("AutoInterface.Application")
09
10    '** Declare some variables for clarity.
11    Dim ShowDialog As Boolean
12    Dim UseAutoSave As Boolean
13    Dim IgnorePrompts As Boolean
14    Dim AcceptDefaultAction As Boolean
15    Dim OnlineAction As IgxOnlineAction
16
17    '** Initialize these variables to suitable defaults
18    ShowDialog = False
19    UseAutoSave = False
20    IgnorePrompts = True
21    AcceptDefaultAction = True
22    OnlineAction = IgxGoOffline
23
24    '** Open a project from disk that will be modified.
25    Set g_Project  = g_Application.FileOpen( "C:\Projects\Upload.rsp", ShowDialog, UseAutoSave)
26
27    '** Obtain the program file object for program file 2. Cast this object to a LadderFile object since
28    '** in this case, program file 2 is also a ladder file.
29    Set g_ProgFile = g_Project.ProgramFiles(2)
30    Set g_LadderFile = g_ProgFile
31
32    '** Build up a sample rung manually
33    Dim RungString As String
34    RungString = "SOR XIC B3:0/0 OTE B3:0/1 EOR"
35
36    '** Insert this rung into the ladder at position 0
37    g_LadderFile.InsertRungAsAscii 0, RungString
38
39    '** Save the modified project to disk first, then
40    '** download the image to the processor and set the processor to RUN mode.
41    '** Once this is completed, the new rung is executing in the processor.
42    Dim NoError As Boolean
43    NoError  = g_Project.Save(IgnorePrompts, AcceptDefaultAction)
44    NoError  = g_Project.Download(IgnorePrompts, OnlineAction, IgxREMOTERUN)
45 End Sub
```

FIG. 7

INDUSTRIAL CONTROLLER AUTOMATION INTERFACE

CROSS-REFERENCE TO RELATED APPLICATIONS

This application is a continuation of pending U.S. patent application Ser. No. 13/911,866, filed Jun. 6, 2013 and entitled "INDUSTRIAL CONTROLLER AUTOMATION INTERFACE" now issued as U.S. Pat. No. 9,104,185, which is a continuation of U.S. patent application Ser. No. 12/189,517, filed Aug. 11, 2008, now issued as U.S. Pat. No. 8,484,665, entitled "INDUSTRIAL CONTROLLER AUTOMATION INTERFACE", which is a continuation of U.S. patent application Ser. No. 11/533,991, filed Sep. 21, 2006, now issued as U.S. Pat. No. 7,424,329, entitled "INDUSTRIAL CONTROLLER AUTOMATION INTERFACE", which is a continuation of U.S. patent application Ser. No. 10/945,189, filed Sep. 20, 2004, now issued as U.S. Pat. No. 7,130,704, entitled "INDUSTRIAL CONTROLLER AUTOMATION INTERFACE", which is a continuation of U.S. patent application Ser. No. 09/928,623, filed Aug. 13, 2001, now issued as U.S. Pat. No. 6,819,960, entitled "INDUSTRIAL CONTROLLER AUTOMATION INTERFACE". The entireties of the aforementioned applications are incorporated herein by reference.

TECHNICAL FIELD

The present invention generally relates to industrial control systems and in particular to an automation interface for industrial controllers.

BACKGROUND OF THE INVENTION

Industrial controllers are special purpose computers used for controlling factory automation devices. Under the direction of a stored program, a processor of the industrial controller examines a series of inputs reflecting the status of a controlled process or device and changes outputs affecting control of the controlled process or device. Generally industrial controllers are constructed in modular fashion to accommodate different application requiring different numbers and types of input/output (I/O) circuits as is determined by the particular device or process being controlled. The stored control program runs in real-time to provide outputs to the controlled process as electrical signals to outputs such as actuators and the like. The outputs are based on the logic of the control program and inputs received from sensors of the controlled process.

The industrial controller or programmable logic controller (PLC) executes a series of operations that are performed sequentially and repeatedly. In general, the series of operations includes an input scan, a program scan, and an output scan. During the input scan the PLC examines the on or off state of the external inputs and saves these states temporarily in memory (e.g., a file). During the program scan the PLC scans the instruction of the program and uses the input status to determine if an output will be energized. The output results are then saved to memory (e.g., a file). During the output scan the controller will energize or de-energize the outputs based on the output results stored in memory to control the external devices.

A conventional language for programming the stored program is relay ladder logic. Each ladder logic program comprises one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and a second input is "on".

The ladder logic program not only manipulates single-bit input and output data representing the state of the sensing and operating devices, but also performs arithmetic operations, timing and counting functions, and more complex processing operations.

A ladder program can be created by connecting a special input module to a PLC that includes a small keyboard and entering ladder logic statements directly into the memory of the PLC. Another method of creating a ladder logic program involves, utilizing a ladder logic program development/editor tool residing on a separate device, such as a personal computer. An operator or programmer of the personal computer draws a series of ladder logic graphs representing each rung or instruction directly on the computer display screen. Once the ladder logic program is complete, the PC software converts the graphs into the corresponding ladder logic commands. The ladder logic command are then transferred to the PLC and stored in the PLC memory.

A PLC and/or a personal computer device can store one or more ladder logic programs and versions. However, a user must manually upload, download, edit and develop ladder logic programs at a work station or personal computer running a developer/editor application program. Furthermore, data backup and storage must be manually invoked by an operator through the application program or be conducted through another system separate from the application program. Accordingly there is an unmet need in the art to provide an improved system and method for developing, editing, replacing and monitoring industrial control programs and/or data associated with a controlled process involving the industrial controller.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for providing an automation interface for interacting with industrial controllers. The automation interface provides for programming, editing, monitoring and maintenance of industrial controllers programmatically from a local or remote location. The automation interface component is adapted to communicate with industrial controllers by integrating a computer process interface library into the automation interface component. The computer process interface library exposes the automation interface component to client application processes, so that the client application processes can communicate with the at least one industrial controller programmatically. The automation interface is provided with functionality for downloading, uploading and programming of control programs to the processors of the industrial controllers.

The automation interface also allows for data associated with one or more control processes to be accessible programmatically. The data can be used to determine status information of the one or more control processes or logged for later analysis. The automation interface can be exposed to a web service, such that industrial controllers can be accessed via the Internet. Data associated with one or more control processes can be logged at a third party data store, so that system backup can be outsourced.

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 5 illustrates a code module for downloading a control program to a processor of an industrial controller through the automation interface in accordance with one aspect of the present invention.

FIG. 6 illustrates a code module for uploading a control program from a processor of an industrial controller through the automation interface in accordance with one aspect of the present invention.

FIG. 7 illustrates a code module for inserting a rung into a control program and downloading the control program to a processor of an industrial controller through the automation interface in accordance with one aspect of the present invention.

DETAILED DESCRIPTION OF THE INVENTION

Figure 1:
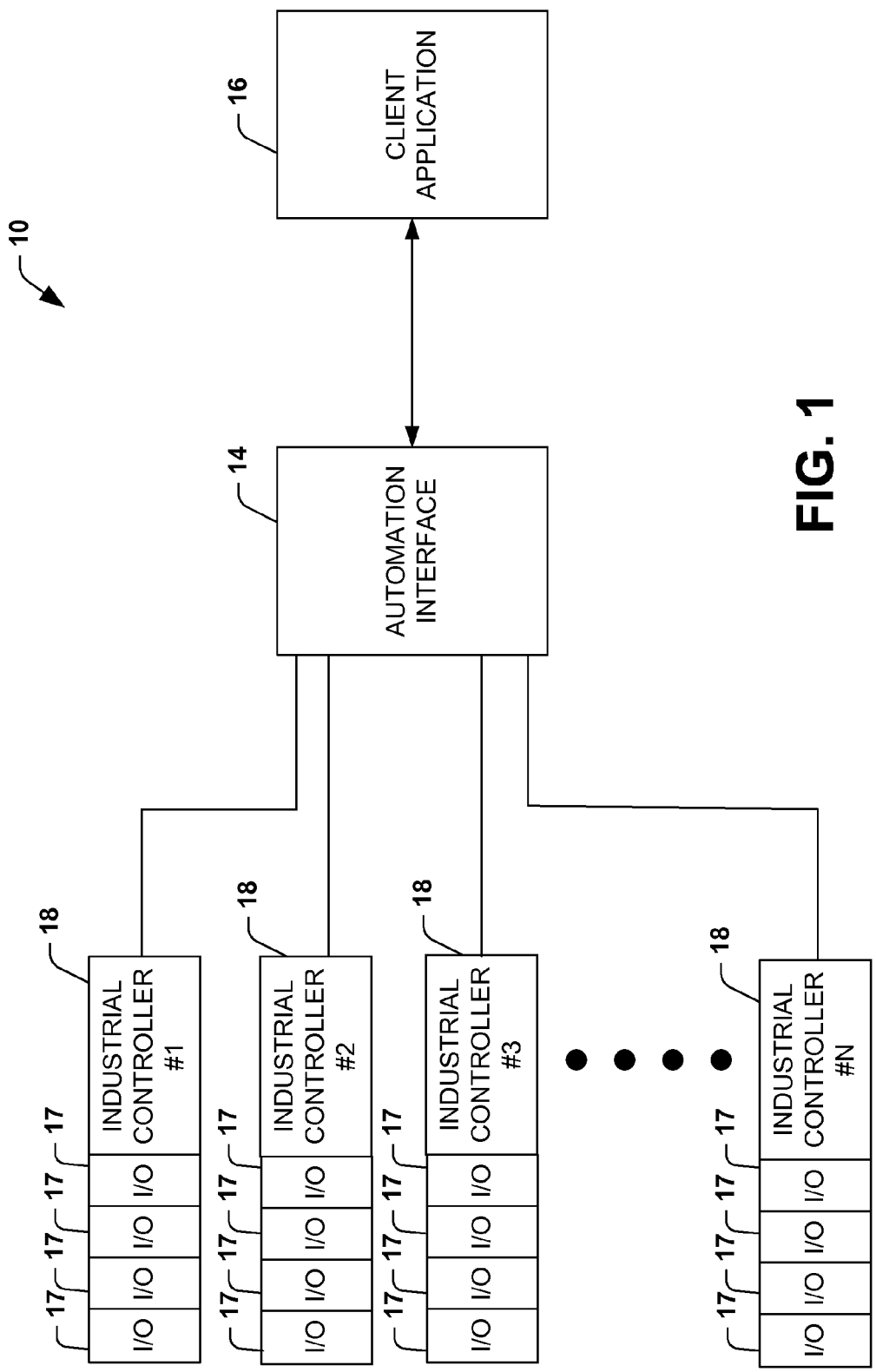
FIG. 1 illustrates a block schematic diagram of a system employing an automation interface in accordance with one aspect of the present invention.

The present invention will now be described with reference to the drawings. The present invention will be described with reference to a system and method for providing an automation interface for interacting with industrial controllers. The automation interface provides for programming, editing, monitoring and maintenance of industrial controllers programmatically. For example, one or more control programs associated with an industrial controller or programmable logic controller (PLC) can be created and/or edited locally or remotely via the automation interface. The automation interface also allows for monitoring and maintenance to be provided by exposing the automation interface to local and remote applications. For example, data associated with one or more control processes can be accessed programmatically. The data can be used to determine status information of the one or more control processes or logged for later analysis. Furthermore, process parameters and/or control programs can be changed programmatically such that operator intervention is eliminated. The present system and method may be implemented utilizing hardware, software or a combination of both hardware and software.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list.

Methods and message passing in OOP are analogous to procedures and procedure calls in procedure-oriented software environments. However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

The present examples will be illustrated with respect to providing an automation interface having a set of objects conforming to the Component Object Model (COM) developed by Microsoft Corporation of Redmond, Wash. COM is an object-oriented programming model that provides a standard as to how objects within a single application or between applications (e.g., client/server applications) interact and communicate. COM defines a set of standard interfaces, which are groupings of semantically related functions through which a client application accesses the services of, for example, a server application. The present example is provided with respect to integrating a COM interface, such as IDispatch, into an executable program (.exe) to provide for remote automation across a network. It is appreciated that a variety of other mechanisms (e.g., interfaces) can be employed to provide both remote and local access to the automation interface of the present invention. For example, communications through computer processes can occur through Dynamic Data Exchange (DDE), named pipes and shared memory to name a few. Other mechanisms of providing communications between processes would be apparent to those skilled in the art of computer programming.

FIG. 1 illustrates a system 10 for interacting programmatically with one or more industrial controllers 18 through an automation interface 14. Each of the industrial controllers are coupled to one or more input/output (TO) modules 17 through a common backplane. A client application 16 can communicate to the one or more industrial controllers 18 through the automation interface 14. The automation interface 14 and the client application 16 operate as separate computer processes. The automation interface 14 is a stand alone executable file provided with one or more components having one or more computer process interfaces compiled therein. The one or more computer process interfaces allow the client application to access the one or more components either locally or remotely. The automation interface has a visible mode provided with a user interface and an invisible mode where no user interface is provided.

For example, if the automation interface 14 includes compiled COM libraries, the client application 16 can access the automation interface 14 through a local procedure call (LPC) or a remote procedure call (RPC). A set of proxies and stubs (DLLs) are provided to marshall and unmarshall parameters associated with local and remote calls. The automation interface 14 is provided with a set of classes (e.g., C++, JAVA, C#) or functions having functionality for communicating with one or more industrial controllers residing in a work environment (e.g., a factory floor). The set of classes include functionality for uploading, downloading, editing and creating of control programs of one or more industrial controllers. Additionally, the set of classes include functionality for accessing control process data for monitoring and storage of the control process data. Data table values in controller memory can be accessed and edited programmatically through the automation interface 14.

Figure 2:
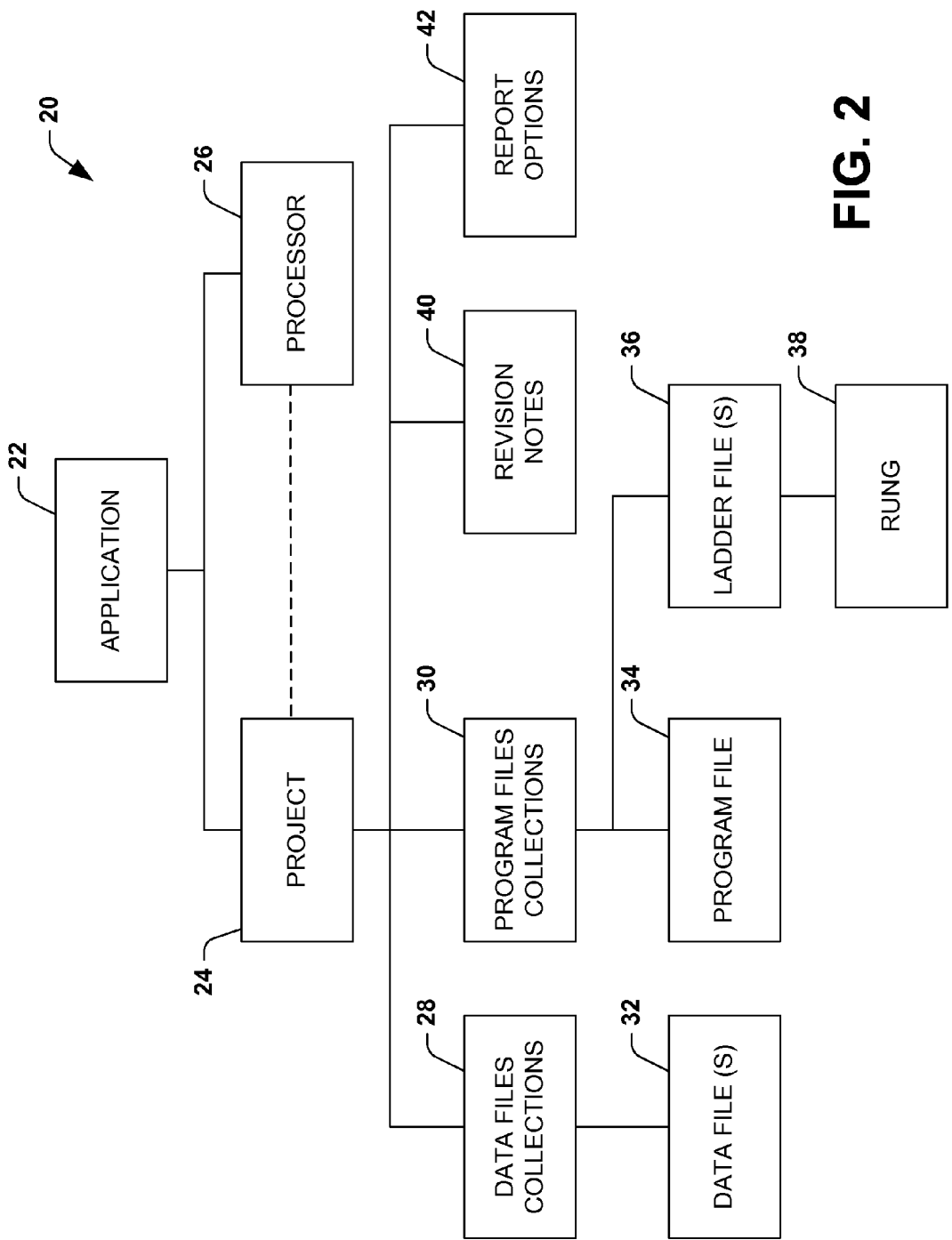
FIG. 2 illustrates a block diagram of a tree structure of components associated with the automation interface in accordance with one aspect of the present invention.

FIG. 2 illustrates an example of an object or class tree 20 associated with the automation interface 14. Each of the objects can have one or more properties, methods and events associated with the object. The object or class tree 20 includes a top level application object 22 from which all other objects within the object tree can be accessed. The application object 22 is the main object interface for client applications. The application object 22 represents the topmost object used to access other objects and perform top level operations. A call to an application object creates an instance of that class in memory and represents the automation interface to the client application. A project object 24 is associated with each industrial controller. The project object 24 can be obtained from the application object 22 through one or more methods. The application object 22 can have one more project objects 24 meaning that an application object 22 can access and/or edit control programs of one or more industrial controllers. A processor object 26 is provided, which represents the processor being used with a current project.

A program files collection object 30 is provided which represents all of the program files in a project. The program files collection object 30 can be a property of the project object 24. The program file object 34 represents the basic functionality of a program file and can be contained from the program files collection object 30. One or more program files 34 can be associated with the program files collections object 30. A data files collection object 28 is provided, which represents a collection of data files associated with the project. The data files collections object 28 can be a property of the project object 24. A data file object 32 represents a data file in the project or processor and can be obtained from the data files collections object 30. One or more data files can be associated with the data files collections object 28.

A ladder file object 36 represents a ladder file in the project/ processor. The ladder file object 36 can be obtained from the program files collections 30. A rung object 38 is provided, which represents a rung of ladder logic that can be inserted, deleted or retrieved and edited in a ladder file object 36. A revision notes object 40 is provided that represents the revision notes associated with any project. A reports option object 42 represents the report settings associated with a project.

It is to be appreciated that the object tree 20 is but one example of a possible implementation to carry out the functionality associated with the automation interface in accordance with the present invention. Of course, many variations and modifications could be construed by those skilled in the art.

Figure 3:
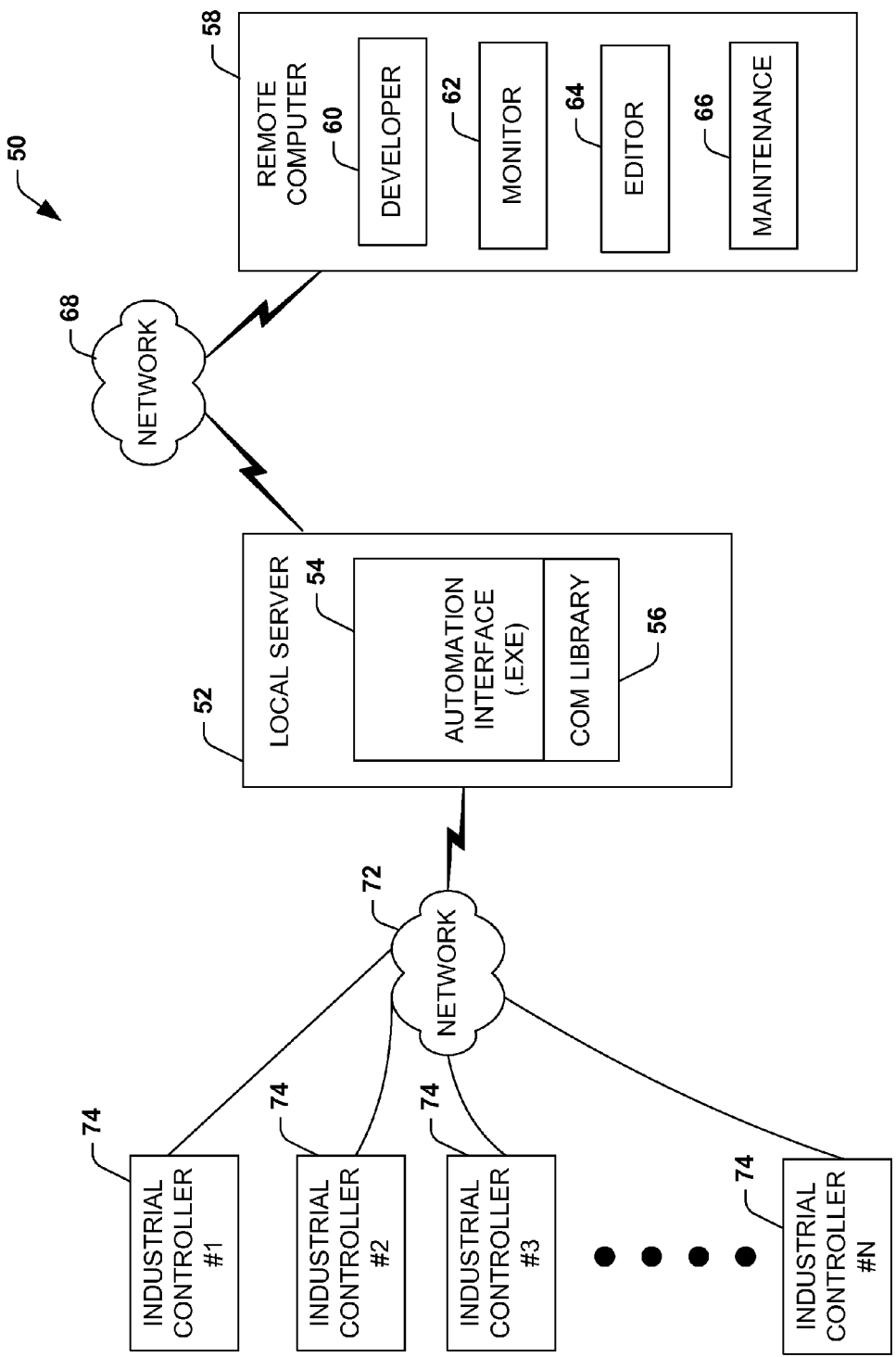
FIG. 3 illustrates a block schematic diagram of a remote computer interacting with the automation interface residing on a local server in accordance with one aspect of the present invention.

FIG. 3 illustrates a system 50 for interacting programmatically to one or more industrial controllers 74 via a remote computer 58 in accordance with one aspect of the present invention. An automation interface 54 resides on a local server 52. The automation interface 54 is a binary executable program having at least one COM library 56 compiled therein. The COM library 56 provides the automation interface 54 with one or more computer process interfaces to allow communication to occur between the automation interface 54 and one or more computer processes located locally or remotely. The local server 52 is coupled to one or more industrial controllers 74 through a network 72 (e.g., local network, factory network). The network 72 allows communication to occur between the automation interface 54 and the one or more industrial controllers 74.

The remote computer 58 is coupled to the local server 52 through a network 68 (e.g., company intranet, Internet). The remote computer 58 includes one or more application programs for communicating to the industrial controllers 74 at one or more factory locations. The remote computer 58 includes a developer application 60 for developing industrial control programs (e.g., ladder logic programs) and downloading those programs to the industrial controllers 74. The remote computer 58 also includes a monitor application 62, which monitors data conditions of controlled processes associated with the industrial controllers 74. An editor application 64 is provided that uploads control programs from one or more or the industrial controllers, edits or allows editing of the control programs in addition to saving and downloading the control programs back to the respective industrial controller. A maintenance application 66 is provided which operates to automatically determine when different control programs are to be invoked and/or replaced with other control programs based on a particular process and/or time period. The maintenance application 66 can also determine periodic intervals for calibrating controlled processes.

The developer application 60, the monitor application 62, the editor application 64 and the maintenance application 66 are but a few examples of implementations that can be employed as a result of exposing the automation interface 54 to remote applications, and provide functionality to the automation interface 54 for uploading, downloading, editing, monitoring, data storing and other functions associated with industrial controller programs, data and processes. Although, the developer application, monitor application, editor application and maintenance application are illustrated as separate applications, the functionality associated with each can be integrated into a single application program. A user interface can be provided to the applications program to allow users to manually control functions, or functions can be controlled programmatically without any user intervention.

Figure 4:
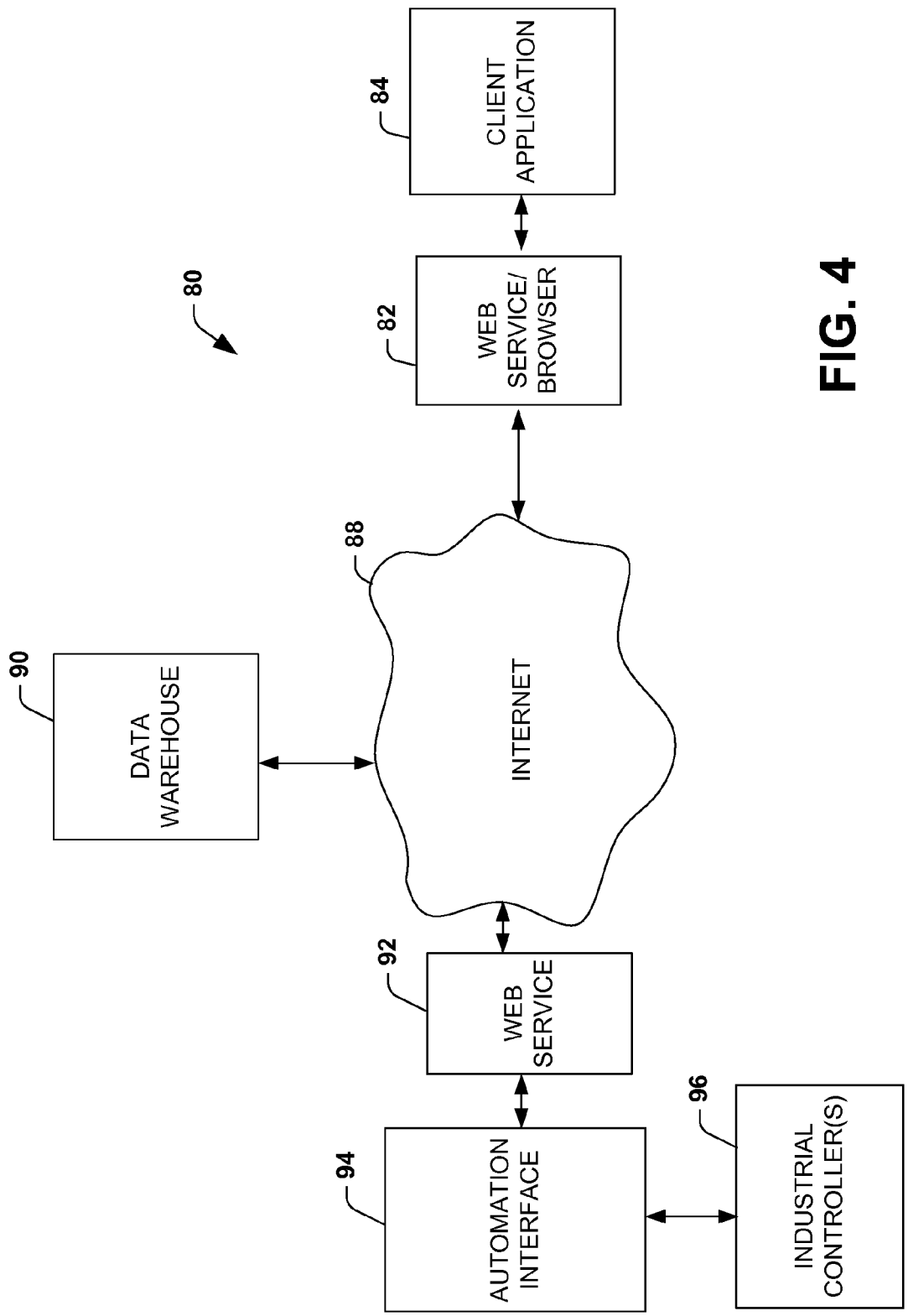
FIG. 4 illustrates a block schematic diagram of a client application accessing the automation interface via the Internet in accordance with one aspect of the present invention.

FIG. 4 illustrates another example of a possible implementation employing the automation interface of the present invention. An automation interface 94 is exposed to a web service 92, which allows communication to the automation interface 94 over the Internet 88. The automation interface 94 is coupled to one or more industrial controllers 96. A client application 84 is coupled to the Internet 88 via a web service and web browser 82, so that the client application can communicate to the automation interface 94 over the Internet. The automation interface 94 includes functionality for uploading, downloading, editing and creating of control programs of the one or more industrial controllers 96. Additionally, the automation interface 94 includes functionality for accessing control process data for monitoring and storage of the control process data. The client application 84 can call the automation interface 94 through the Internet 88, for example, using TCP/IP protocol and invoke any or all of the services associated with the automation interface 94 and the industrial controller(s) 96 anywhere in the world via an Internet connection. In the example of FIG. 4, the client application 84 periodically downloads backup data to a third party data warehouse 90 at another location different from the client application 84 and the automation interface 94. The data backup can then be stored and analyzed off-site, such that third party auditing and/or outsourcing can be provided.

Other functions such as editing, development, monitoring and maintenance can be performed by the client application 84 through an Internet connection. Additionally, event-driven HTML reports can be generated by the client application either at the client locations and/or at the location of the industrial controllers. Furthermore, the application data and functionality can be shared with developers within a common environment. Developers can also build their own individualized interfaces that execute functionality within the automation interface through a client application.

Since the automation interface 84 is provided with computer process interfaces for communicating between computer processes in executable form, any programming language can be employed to interact and communicate with the automation interface using similar type interfaces on the client application end. FIGS. 5-7 illustrate the use of Visual Basic code for carrying out the functionality of downloading of control programs, uploading of control programs and the insertions of rungs within control programs. The present invention allows for functionality to be grouped into macros, so that individual code instructions can be eliminated for repetitive tasks. A variety of other functionality and computer programming languages can be employed to carry out the present invention.

FIG. 5 illustrates a sample application module 100 or subroutine written in Visual Basic for implementing downloading to a processor programmatically in accordance with one aspect of the present invention. In line 07, a new application project is created or instantiated, which is opened from a project residing on a disk in line 22. The communication routing to the actual processor that the project represents is set up in the application when the project is opened. This information is saved for later uploading in lines 27-28. The project is then downloaded to the processor in lines 31-32.

FIG. 6 illustrates a sample application module 110 or subroutine written in Visual Basic for implementing uploading from a processor programmatically in accordance with one aspect of the present invention. In line 09, a new application project is created, which initializes routing data in line 15. The project is then told which processor to communicate with in line 18. The function to perform the upload is called in line 37 and the uploaded program is saved to a file on a disk at lines 41-43.

FIG. 7 illustrates a sample application module 120 or subroutine written in Visual Basic for inserting ladder logic programmatically in accordance with one aspect of the present invention. In line 09, a new application is created, which instantiates a new instance of the automation interface. A project is then opened from disk for modification at line 25 and a program file is selected for uploading at line 29. The selected program is cast to a ladder file at line 30. A sample rung is then built in lines 33-34 and inserted into the selected program at line 37. It is to be appreciated that the examples of FIGS. 5-7 are for illustrated purposes, and most error detection/correction code was omitted for the sake of clarity.

Figure 8:
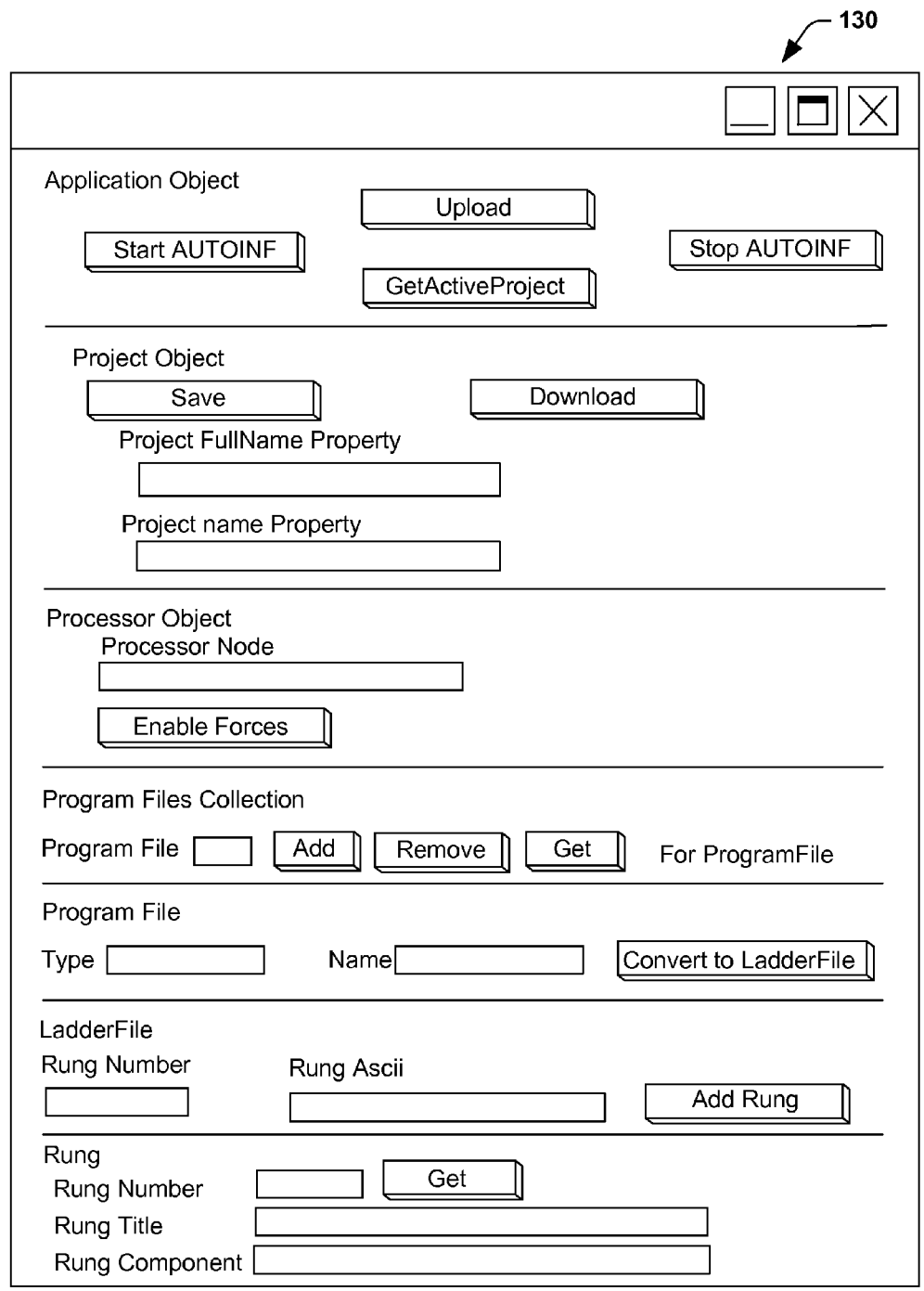
FIG. 8 illustrates a Visual Basic form that provides a variety of functionality for interacting with an industrial controller through the automation interface in accordance with one aspect of the present invention.

A user interface can be provided to interact with the automation interface by utilizing Visual Basic forms. As illustrated in FIG. 8, a Visual Basic form 130 is provided that includes a plurality of buttons and insert spaces for providing data. A button is provided for instantiating an automation interface object, uploading and retrieving an active project and removing the automation interface object from memory. A project object can be saved and downloaded using buttons and a name provided in spaces for saving projects. A processor node can be selected and program files added, removed or retrieved. A program file can be retrieved and converted to a ladder file. The ladder file can then be edited by inserting rungs or deleting rungs to the ladder file. A variety of other functions can be provided utilizing Visual Basic forms.

Figure 9:
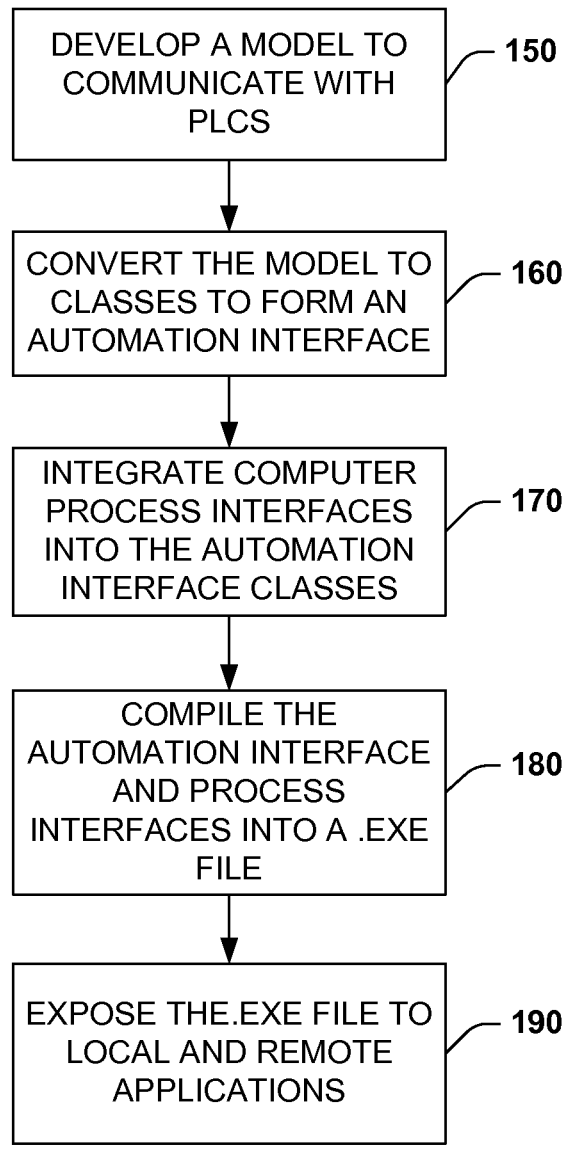
FIG. 9 illustrates a flow diagram of a methodology for providing an automation interface in accordance with one aspect of the present invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 9 illustrates one particular methodology for providing an automation interface in accordance with one particular aspect of the present invention. The methodology begins at 150 with the development of a model for communicating with a plurality of industrial controllers or PLCs. The model is then converted to an object or class tree to form an automation interface at 160. For example, the classes can be developed to form COM components or the like (e.g., DCOM, CORBA). At 170, computer process interfaces are integrated into the automation interface (e.g., COM libraries). The automation interface is then compiled into an executable file so that the executable can be accessed by other processes. At 190, the executable file is exposed to local and remote applications by invoking the executable file with the exposed computer process interfaces.

Figure 10:
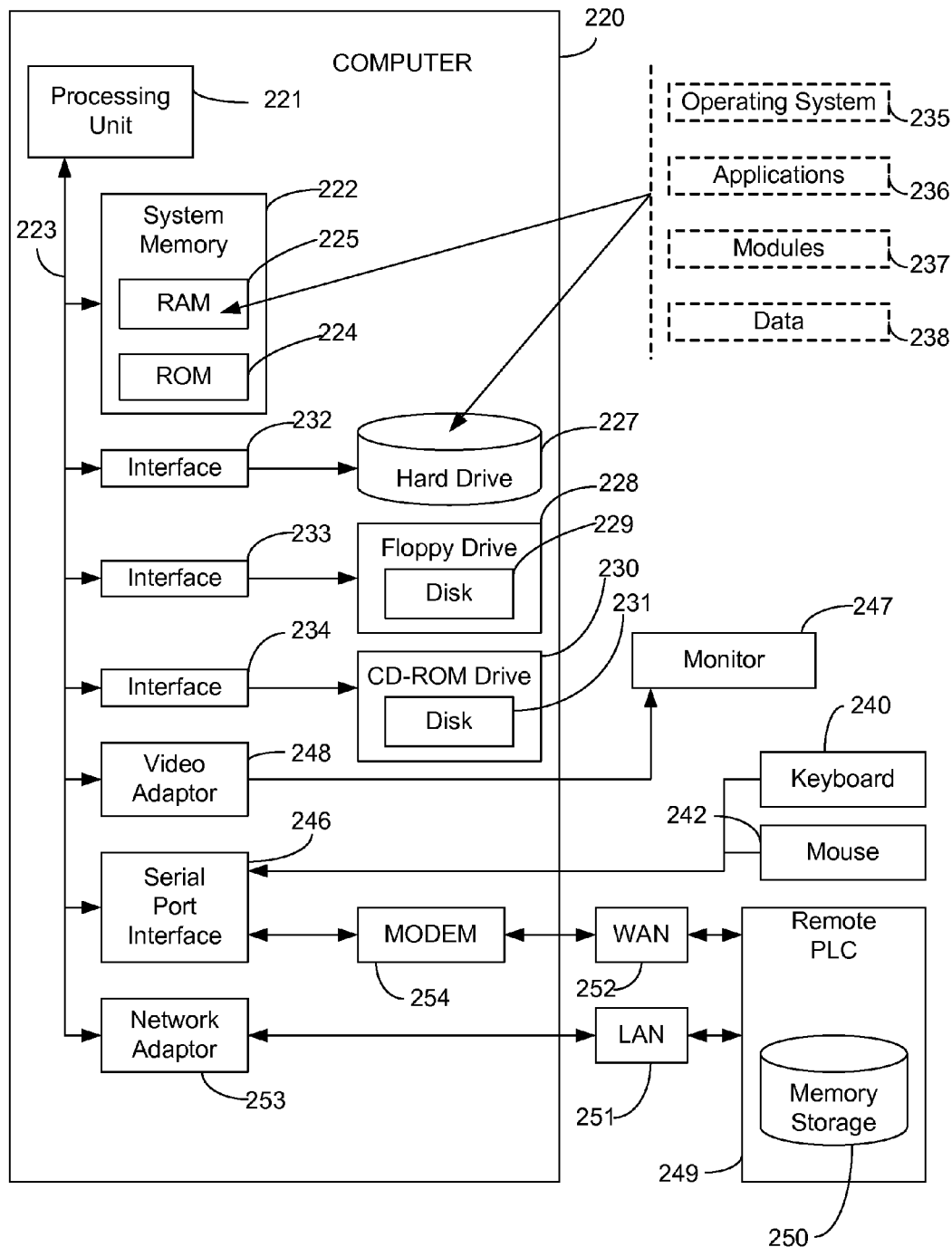
FIG. 10 illustrates a block diagram of a computer system in accordance with an environment of the present invention.

With reference to FIG. 10, an exemplary system for implementing the invention includes a conventional personal or server computer 220, including a processing unit 221, a system memory 222, and a system bus 223 that couples various system components including the system memory to the processing unit 221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc., for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, and program data 238. A user may enter commands and information into the computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote PLCs, such as a remote PLC 249. Alternatively, the remove PLC 249 may be coupled to a workstation, a server computer, a router, a peer device or other common network node remote device. This remote device can include many or all of the elements described relative to the computer 220, although only a memory storage device 250 has been illustrated in FIG. 10. The logical connections depicted in FIG. 10 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. A method comprising:
   establishing, by a server computer in communication with a programmable logic controller, one or more classes of objects, including defining at least one attribute or method for each object;
   assigning, by the server computer, a project object to the programmable logic controller, the project object being associated with at least one program file object residing on the programmable logic controller and at least one data file object residing on the programmable logic controller;
   executing, by the server computer, an automation interface exposed to a client application;
   receiving, by the server computer via the automation interface from the client application, a data request to upload control process data from a data file object, the data request specifying the control process data as an attribute of the project object or an object associated with the project object; and
   based on the specified control process data attribute in the received data request, executing, by the server computer via the automation interface, the data request with the programmable logic controller associated with the project object associated with the specified control process data attribute.

2. The method of claim 1, further comprising:
   receiving and processing, by the server computer via the automation interface, a client request from the client application according to a first communication protocol; and
   invoking, by the server computer via the automation interface, one or more communications classes or functions of the one or more classes of objects to execute the client request with the programmable logic controller via a second communication protocol that is different from the first communication protocol.

3. The method of claim 1, wherein the client application resides on a remote computer that is connected to the server computer through a network.

4. The method of claim 1, generating, by the server computer based on the one or more classes of objects, the automation interface.

5. A method comprising:
   establishing, by a server computer in communication with a programmable logic controller, one or more classes of objects, including defining at least one attribute or method for each object;
   assigning, by the server computer, a project object to the programmable logic controller, the project object being associated with at least one program file object residing on the programmable logic controller and at least one data file object residing on the programmable logic controller;
   executing, by the server computer, an automation interface exposed to a client application;
   receiving, by the server computer via the automation interface from the client application, a request specifying the project object to upload from or download to the programmable logic controller associated with the project object; and
   based on the project object specified in the received request, executing, by the server computer via the automation interface, the request with the programmable logic controller.

6. The method of claim 5, further comprising:
   receiving and processing, by the server computer via the automation interface, a client request from the client application according to a first communication protocol; and
   invoking, by the server computer via the automation interface, one or more communications classes or functions of the one or more classes of objects to execute the client request with the programmable logic controller via a second communication protocol that is different from the first communication protocol.

7. The method of claim 5, wherein the client application resides on a remote computer that is connected to the server computer through a network.

8. The method of claim 5, wherein:
   wherein the receiving the request comprises receiving the request from the client application specifying the project object to upload from the programmable logic controller associated with the project object; and
   the method further comprises:
   receiving, by the server computer via the automation interface, another request from the client application specifying an edited version of the project object to download to the programmable logic controller associated with the project object; and
   based on the edited version of the project object specified in the other request, executing, by the server computer via the automation interface, the other request with the associated programmable logic controller.

9. A method comprising:
   establishing, by a server computer in communication with a programmable logic controller, one or more classes of objects, including defining at least one attribute or method for each object;
   assigning, by the server computer, a project object to the programmable logic controller, the project object being associated with at least one program file object residing on the programmable logic controller and at least one data file object residing on the programmable logic controller;
   executing, by the server computer, an automation interface exposed to a client application;

receiving, by the server computer via the automation interface, a data request from the client application which specifies an attribute of an object associated with the project object;

identifying, by the server computer via the automation interface, the project object based on the attribute and the industrial controller associated with the project object;

issuing, by the server computer via the automation interface, a request to the industrial controller for data associated with the attribute of the object specified in the data request;

receiving, by the server computer via the automation interface, the requested data from the industrial controller;

passing, by the server computer via the automation interface, the requested data to the client application.

10. The method of claim 9, wherein the data request is received according to a first communication protocol, the requested data is passed according to the first communication protocol, the request is issued according to a second communication protocol that is different from the first communication protocol, and the requested data is received according to the second communication protocol.

* * * * *